United States Patent [19]

Woloszczuk

[11] Patent Number: 5,307,337
[45] Date of Patent: Apr. 26, 1994

[54] OPTICAL DISK DRIVE HAVING A LOW-EMISSION HIGH-BANDWIDTH LASER DRIVER

[75] Inventor: Eugeniusz A. Woloszczuk, San Jose, Calif.

[73] Assignee: Maxoptix Corporation, San Jose, Calif.

[21] Appl. No.: 915,422

[22] Filed: Jul. 17, 1992

[51] Int. Cl.⁵ .................................................. G11B 7/12
[52] U.S. Cl. ...................... 369/121; 369/116; 372/29; 372/31; 372/28; 372/25
[58] Field of Search ............... 369/121, 116; 372/29, 372/31, 82, 28, 25

[56] References Cited

U.S. PATENT DOCUMENTS

| | | | |
|---|---|---|---|
| 3,798,548 | 3/1974 | White et al. | 325/309 |
| 4,238,679 | 12/1980 | Macmillan et al. | 250/385.1 |
| 4,635,265 | 1/1987 | O'Harra | 372/25 |
| 4,675,872 | 6/1987 | Popek et al. | 372/10 |
| 4,817,102 | 3/1989 | Maurer et al. | 372/45 |
| 4,924,470 | 5/1990 | Ries | 372/26 |
| 4,924,473 | 5/1990 | Burgyan et al. | 372/38 |
| 4,974,229 | 11/1990 | Egawa | 372/38 |
| 5,036,519 | 7/1991 | Ema et al. | 369/116 |

*Primary Examiner*—Paul M. Dzierzynski
*Assistant Examiner*—James Beyer
*Attorney, Agent, or Firm*—Blakely, Sokoloff, Taylor & Zafman

[57] ABSTRACT

An optical recording system having a laser for generating a light beam to write data to and read data from a storage medium, an RF modulator for modulating the laser to improve its stability, and an apparatus for driving the laser. The apparatus is comprised of a transistor coupled to the laser for supplying current to the laser. An amplifier is implemented to drive the base of the transistor according to a microprocessor. Thereby, the microprocessor effectively controls the power level of the laser. The transistor and the RF modulator are enclosed within shielding to contain the RF energy being generated by the modulator. In addition, the collector-base separation of the transistor reduces the RF energy being transmitted through the line driving the base of the transistor.

14 Claims, 5 Drawing Sheets

OPTICAL DISK DRIVE HAVING A LOW-EMISSION HIGH-BANDWIDTH LASER DRIVER

FIELD OF THE INVENTION

The present invention pertains to the field of optical recording systems. More particularly, the present invention relates to implementing a low emission driver having a high bandwidth for driving a laser used to read and write data from/to an optical storage medium.

BACKGROUND OF THE INVENTION

Today, optical-based data storage systems are commercially competitive due to their high storage density, relatively low cost, and random access capability. Moreover, magneto-optical data storage systems offer the added flexibility of allowing an optical medium to be erased and new data written in place of the erased section. This feature grants a user the capability to reuse an optical medium many times over by erasing old data and substituting new data in place thereof.

Basically, magneto-optical recording operates in the following manner. Data is stored as a series of binary bits (i.e., 1s and 0s). A laser beam is focused onto an optical medium, usually by means of a lens assembly. Initially, the optical medium is perpendicularly magnetized. To write a "1," the laser beam is pulsed at a high power for a short duration. This raises the temperature of the optical medium to such a degree that an externally applied magnetic field reverses the direction of magnetization in the heated region. When the medium returns to its lower ambient temperature, the "domain" retains its reverse magnetization.

The domains are "erased" by using the laser to perform the same thermal process used to write the data, except that an oppositely directed external magnetic field is applied. Thereby, the domains revert back to their original magnetization.

The stored data is read from the optical medium based on the polar curve principle. This principle states that linearly polarized light, reflected from a perpendicularly magnetized medium, is rotated according to the direction of magnetization. Hence, the magnetization transitions of the domains stored on the media can be read by determining the direction of the plane of polarization of the reflected light. The same laser used to write the data is also used to generate the reflected light for reading the stored data, except that its power is reduced to avoid inadvertently writing data onto the medium.

This type of recording system has one common problem in that, typically, there is no isolation between the laser and the storage medium. Consequently, the light generated by the laser used to read the data stored on the medium is reflected from the medium and directed back at the laser. As a result of this feedback light, the laser becomes unstable. The instability interferes with the reading of data from the medium. That is to say, the instability is a form of noise.

One prior art approach to minimize the instability caused by the feedback light has been to incorporate a radio frequency (RF) modulator. FIG. 1 illustrates a typical prior art RF modulator and laser driver used in magneto-optical recording systems. A laser driver 100 is used to drive a laser diode 101. The RF modulator 102 is implemented to modulate the laser diode 101 at relatively high frequencies (approximately 300-600 MHz). By modulating the laser diode 101, instabilities due to reflected light from the medium are minimized.

However, one disadvantage associated with implementing an RF modulator is that RF energy is hard to contain and channel because it tends to radiate to the surroundings and to transmit through wiring. Hence, the modulator is enclosed within an electro-magnetic interference (EMI) shielding box 103. Inductor 104, feed-through capacitor 105, and resistor 106 are implemented as a low-pass filter to reduce the amount of RF energy being transmitted back to laser driver 100 through line 107. If the LRC 104-106 low-pass filter were not implemented, the RF energy from modulator 102 would trace back to laser driver 100 through line 107, thereby creating a D.C. offset in pre-amplifier 108. The D.C. offset can be compensated, but since RF pickup varies from one device to another, each device must be individually compensated manually. Such a process is labor intensive, costly, and time-consuming.

However, implementing an LRC 104-106 low-pass filter is disadvantageous because it limits the bandwidth of laser driver 100 in WRITE mode operations. In other words, the same low-pass filter which reduces the RF energy from tracing back to the laser driver during READ operations also acts to inhibit the bandwidth of the laser driver during WRITE operations.

In typical prior art magneto-optical recording systems, low bandwidth laser drivers were sufficient to write data onto storage media at certain locations. The sizes and boundaries of the written domains were not critical so long as the domains were adequately spaced apart and written at the proper locations. The data is read from the media by detecting the locations of each of the written domains. This scheme is known as pulse position detection (PPD). As designers strive to increase the capacity of the storage media by writing the domains closer together, the domains start to interfere with one another. In order to write the domains closely together, the boundaries of each domain need to be precisely defined to minimize interference. A higher WRITE mode bandwidth enables the laser drive to more precisely control the power of the laser. In turn, the edges of the domains can be more precisely defined, resulting in higher storage capacities.

Furthermore, magneto-optical recording systems are being developed which incorporate pulse width modulation (PWM) schemes. PWM is utilized to further increase the capacity of a given media. In PWM, data depends not only from the position of the domain but also from its width. Since information is a function of a domain's width, it is important to precisely control the rising and falling transition edges of a write pulse. Again, a high WRITE mode bandwidth is highly desirable to precisely control the pulse transition edges and, hence, the width of the domains.

One prior art method of implementing a high bandwidth WRITE mode, which also includes an RF modulator and a low-pass filter, is to output a relatively strong signal from the laser driver to drive the laser diode. However, this method is disadvantageous because the strong signal on the wire 107 leading from the laser driver 100 to the EMI shielding 103 causes serious radiated emission problems. The problem is worsened by the fact that the output from the laser driver contains a high level of harmonics due to the fast rise and fall times of the write pulses. In some instances, the emission problems are so serious as to cause the magneto-optical data storage system to fail Class "A" EMI standards set forth by the Federal Communication Commission (FCC).

Therefore, what is needed is a means for containing RF energy while, simultaneously, providing high WRITE mode bandwidth without high radiated emissions.

SUMMARY AND OBJECTS OF THE INVENTION

In view of the problems associated with driving the laser in optical recording systems, one object of the present invention is to provide precise control of the laser power when writing data to a storage medium.

Another object of the present invention is to reduce the amount of RF energy being transmitted to the driver pre-amplifier, so that any induced D.C. offset is minimized.

Another object of the present invention is to minimize the radiated emissions from the output of the laser driver.

Another object of the present invention is to maximize the bandwidth of the laser power control loop.

Another object of the present invention is to incorporate the RF modulator and the output stage of the laser driver on a hybrid circuit and to enclose the hybrid circuit in EMI shielding.

These and other objects of the present invention are implemented in an optical recording system having an RF modulator which modulates the laser during READ mode, in order to improve the stability of the laser. The output stage of the laser driver is placed in close physical proximity to the laser. The RF modulator and the output stage of the laser driver are implemented on a hybrid circuit. The hybrid circuit, along with the laser, are enclosed within EMI shielding to contain the RF energy emitted from the RF modulator. The transistor of the laser driver's output stage inhibits the RF energy from being transmitted back to the rest of the laser driver circuitry. A low-level signal is sufficient to drive the base of the transistor. Thereby, the radiation from this signal is, correspondingly, of a low level.

During WRITE mode, the power of the light beam output from the laser is measured. This information is fed back as an input to control the laser power. In order to maximize the control over the laser WRITE power, to more precisely write a domain onto the storage media, and thereby increase storage capacity, a high bandwidth (>50 MHz) laser power control loop is implemented. Since the transistor effectively blocks the RF energy, a low-pass filter is not necessary. Hence, a high bandwidth control loop can be implemented in the present invention.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In an optical recording system having an RF modulator and a low-pass filter, an apparatus and method for providing wide bandwidth in WRITE mode and having low radiated emissions is described. In the following description, numerous specific details, such as voltages, currents, frequencies, etc., are set forth in order to provide a thorough understanding of the present invention. It will be obvious, however, to one skilled in the art that these specific details need not be used to practice the present invention. In other instances, well-known structures and circuits have been shown in block diagram form to avoid unnecessarily obscuring the present invention. Although the following detailed description is in reference to a magneto-optical disk drive system, the present invention can readily be applied to other types of optical recording systems as well.

Figure 1:
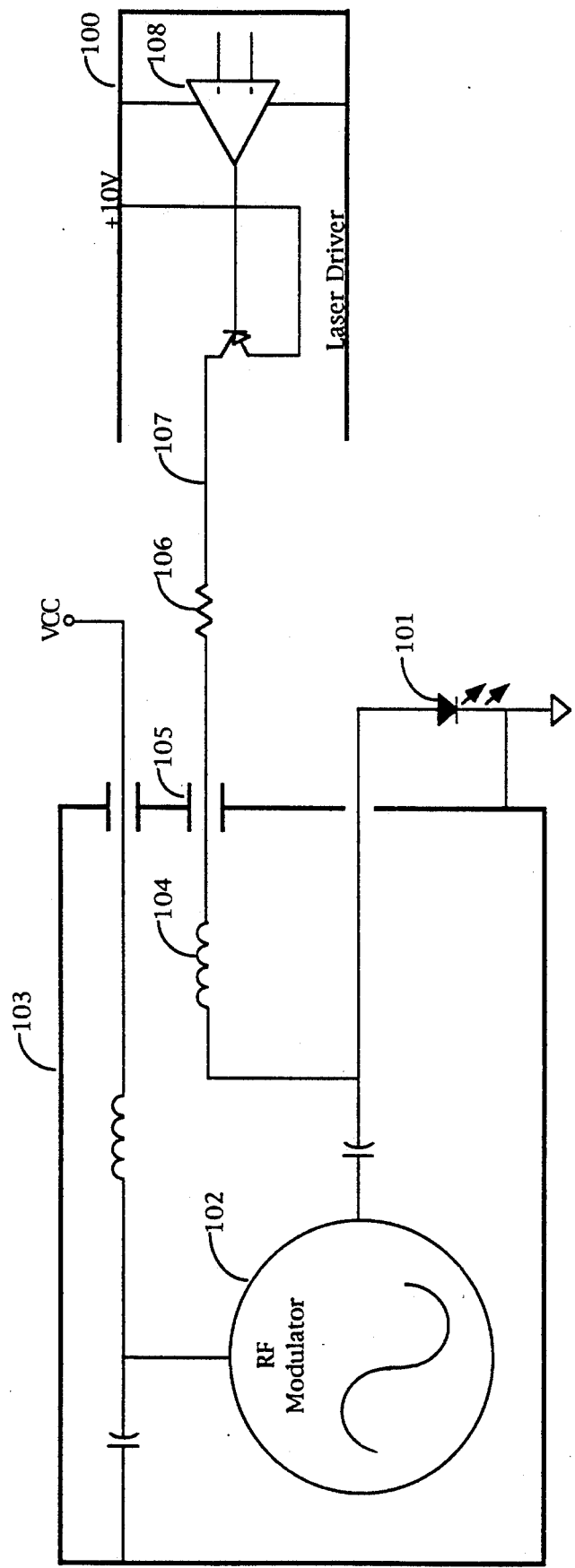
FIG. 1 illustrates a typical prior art RF modulator and laser driver in a magneto-optical recording system.
Figure 2:
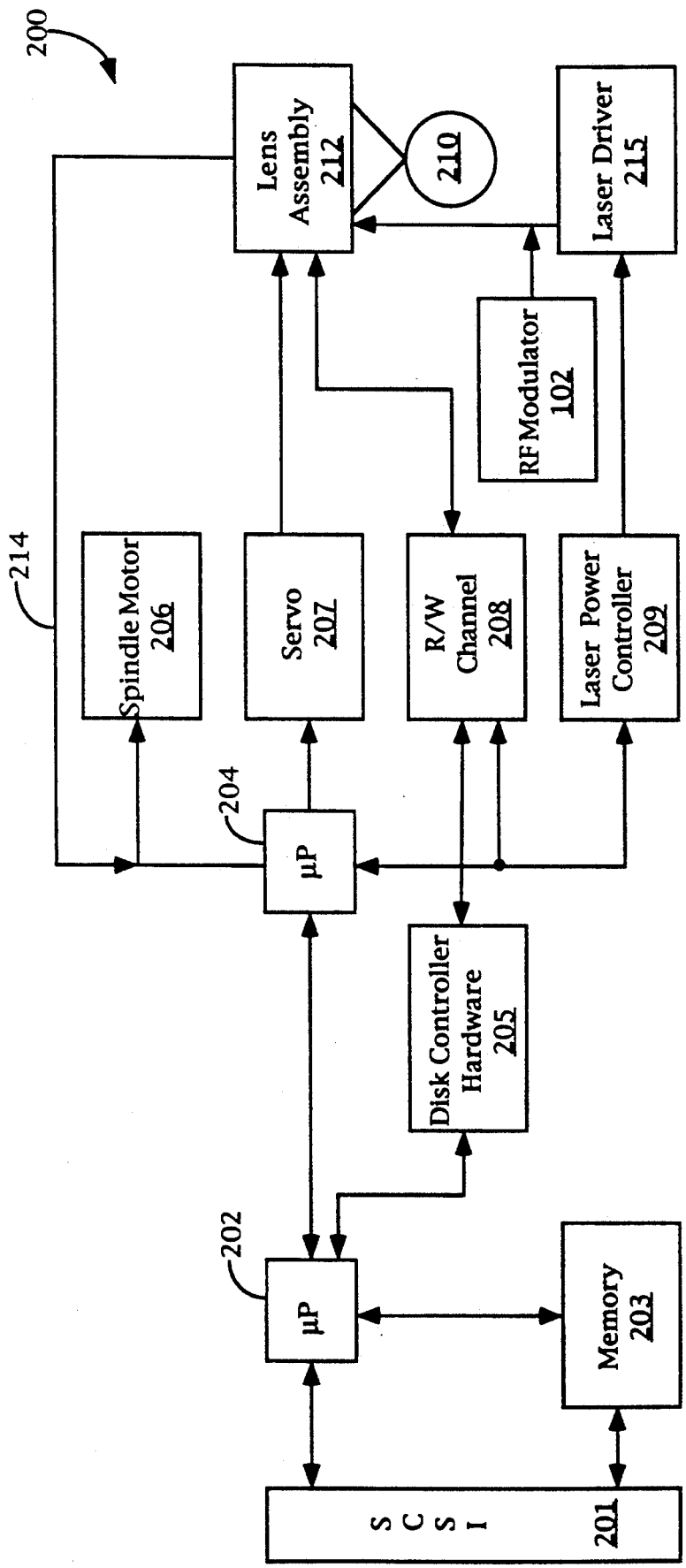
FIG. 2 illustrates a magneto-optical recording system as may be utilized by the currently preferred embodiment of the present invention.

FIG. 2 illustrates a magneto-optical disk drive system 200 as may be utilized by the preferred embodiment of the present invention. The magneto-optical disk drive system 200 is comprised of a SCSI interface 201 which provides an interface between the disk drive system 200 and external instrumentation, usually a computer. The interface 201 is coupled to a controller microprocessor 202 and to memory 203. Controller microprocessor 202 communicates with microprocessor 204 and instructs it per a program stored in memory 203. Controller microprocessor 202 is also coupled to disk controller hardware 205. Disk controller hardware 205 receives data signals read from the disk 210 via read/write channel 208 and converts it into a byte format. Likewise, when data is written via read/write channel 208, disk controller hardware 205 converts the data into a format compatible for storing on disk 210.

Microprocessor 204 controls the spindle motor 206, servo mechanism 207, read/write channel 208, laser power controller 209, and laser driver 215. Spindle motor 206 spins disk 210, and servo mechanism 207 controls the movement of the lens assembly 212 to access each of the tracks of data on disk 210. Read/write channel 208 passes the signals read from and written to disk 210. Laser power controller 209 controls laser driver 213 which sets the power of the laser beam used to read and write the data. The light reflected from disk 210 is detected and fed back through loop 214 to microprocessor 204. Thereby, microprocessor 204 can effectively control the laser pulse. RF modulator 102 is implemented to provide laser stability by modulating the laser.

Figure 3:
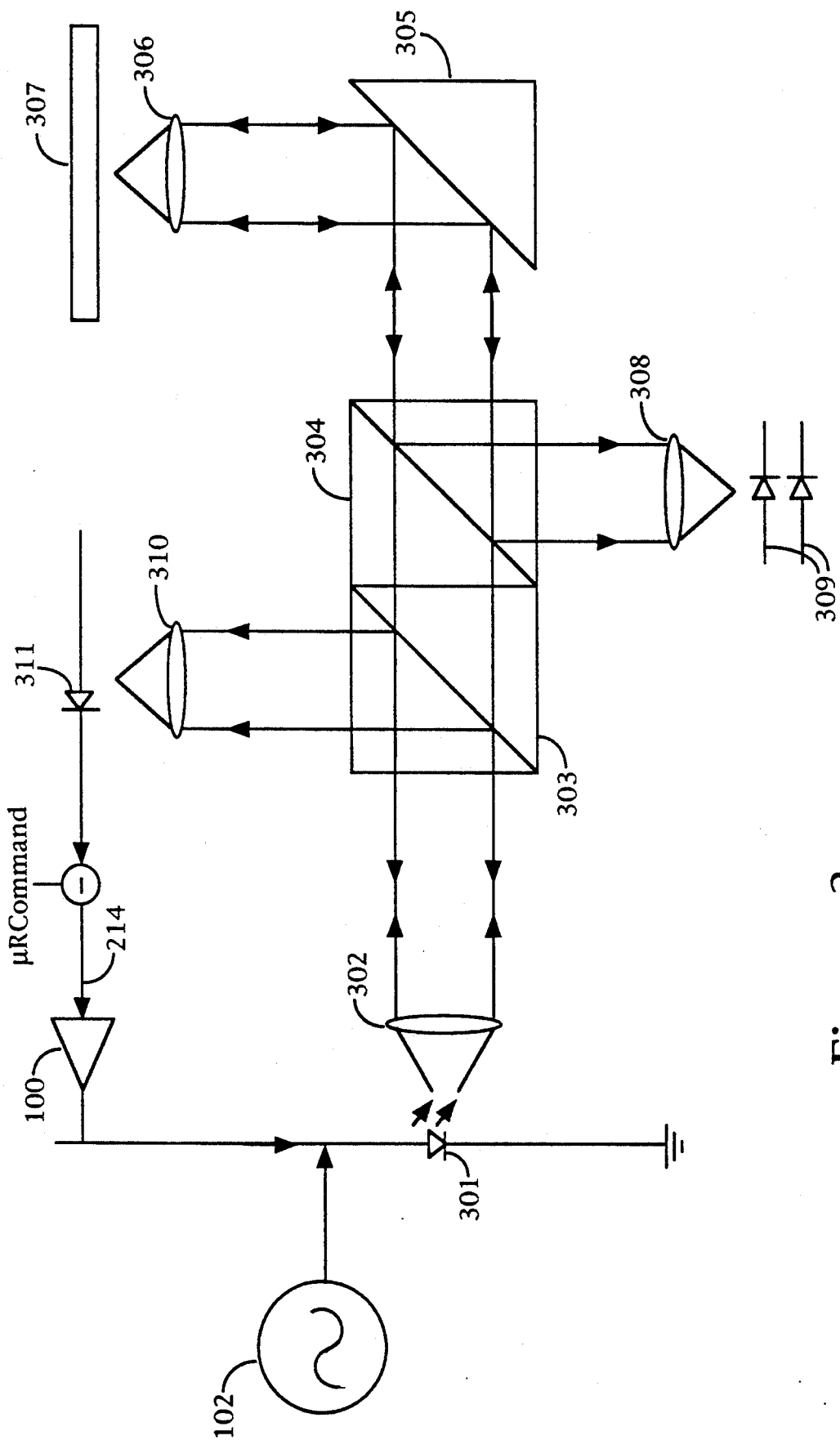
FIG. 3 illustrates the lens assembly and the laser power control loop of the currently preferred embodiment of the present invention.

FIG. 3 illustrates the laser driver 215, RF modulator 102, laser diode 301, lens assembly, and feedback loop in greater detail. During READ modes, the microprocessor commands that a signal be generated and sent to laser driver 215 for driving laser diode 301 at a READ power level of approximately 1.5 mW. Laser diode 301 emits light which is collimated by lens 302. The collimated light beam passes through beam splitters 303 and 304. The incident beam out of beam splitters 303 and 304 is deflected off mirror 305 and passed through lens 306. Lens 306 is a read/write head used to focus the incident beam onto optical disk 307. Typically, a tracking motor coil (not shown) controls the movement of mirror 305 and lens 306 so that the focused light beam can access radial locations across optical disk 307.

The written domains, which are arranged in tracks on optical disk 307, modulate and reflect the light beam back through lens 306. This modulated light beam is deflected by mirror 305 back through beam splitter 304 which splits the beam. Part of the beam is directed to lens 308 which focuses the beam onto pin-diode detectors 309. Detectors 309 produce an electrical signal which is dependent on the modulation of the reflected light beam. This electrical signal is routed to the microprocessor so that data stored on optical disk 307 can be passed as digital bits to a computer system. The other part of the reflected beam passes through beam splitter 303 and is directed back at laser diode 301. In order to counter the instabilities due to this reflected light, laser diode 301 is modulated by RF modulator 102. In the currently preferred embodiment of the present invention, the frequency of RF modulator 102 is approximately 1 GHz.

In WRITE modes, the microprocessor commands a signal be generated and sent to laser driver 100 for driving laser diode 301 at a WRITE power level of approximately 7.5 mW. Laser diode 501 emits light which is collimated by lens 302. The collimated light is passed through beam splitters 303 and 304 and reflected off mirror 305 onto lens 306. Lens 306 focuses the collimated light onto optical disk 307. The focused light heats up a particular domain, thereby "writing" data onto the optical disk. The light used to write data is also reflected from optical disk through lens 306 to mirror 305. The reflected light is directed back through beam splitters 304 and 303. Beam splitter 303 splits the reflected light so that a portion of the light passes through lens 310. Lens 310 focuses the reflected light onto power monitor detector diode 311. Detector diode 311 outputs an electrical signal which is proportional to the power of the reflected light. Based on this signal, the microprocessor adjusts the level by which the laser diode is driven. In short, the output power of the laser is measured and compared with the desired WRITE power level. Any noted differences are fed back as an input to adjust the laser's WRITE power level. Consequently, a faster laser power control loop (i.e., a higher bandwidth) results in tighter control over the WRITE pulse, which translates to a more precisely written domain. In the currently preferred embodiment of the present invention, the bandwidth of the laser power control loop is over 50 MHz.

Figure 4:
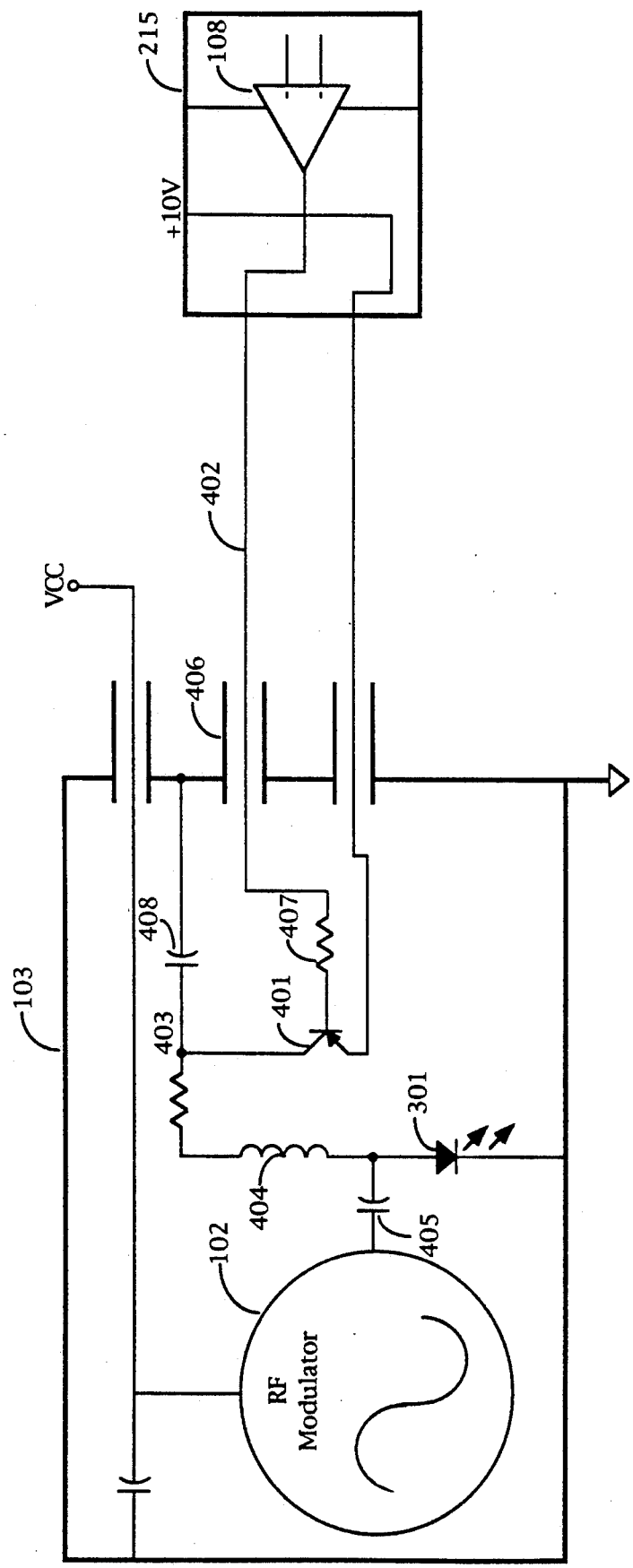
FIG. 4 illustrates the laser driver, RF modulator, and laser diode of the currently preferred embodiment of the present invention.

FIG. 4 is a block diagram illustrating the laser driver 215, RF modulator 102, and laser diode 301 of the currently preferred embodiment of the present invention. Note that the output stage, namely transistor 401, of the laser driver has been moved so that it is in close physical proximity to the laser diode 301. Furthermore, transistor 401 resides inside the EMI shielding box 103. EMI shielding box 103 is comprised of a solid metal box having good conductive properties; this box is grounded.

With this arrangement, the base of transistor 401 is utilized as a signal input. Hence, pre-amplifier 108 can drive the base of transistor 401 using a relatively low-level signal. In the currently preferred embodiment of the present invention, approximately 100-150 mA current is used to drive laser diode 301. Given an approximate beta value of 40 for transistor 401, only 2.5-3.75 mA is required at the base of transistor 401. This low-level signal results in a correspondingly low level of emissions on line 402.

The emitter of transistor 401 is coupled to a +10 volt power supply, which is used to bias transistor 401. The amplified output from the collector of transistor 401 is sent through resistor 403 and inductor 404 to drive the anode of laser diode 301. RF modulator 102 is A.C. coupled through capacitor 405 to laser diode 301. The RF modulator 102 is powered by Vcc (+5 volts). The cumulative effects of feed-through capacitor 406, capacitor 408, inductor 404, and resistors 403 and 407 is to decrease the RF energy transmitted through line 402. In addition, the collector-to-base separation provided by transistor 401 significantly decreases the amount of RF energy transmitted through line 402 back to pre-amplifier 108. Resistor 403 is also utilized to reduce the current supplied to laser diode 301.

Laser diode 301 is mounted inside the EMI shielding box 103. Consequently, the connection of ground lines is, likewise, inside shielding box 103 which minimizes radiation from the laser ground pin. A glass covered opening is provided in shielding box 103 to pass the emitted light to the lens assembly.

Figure 5:
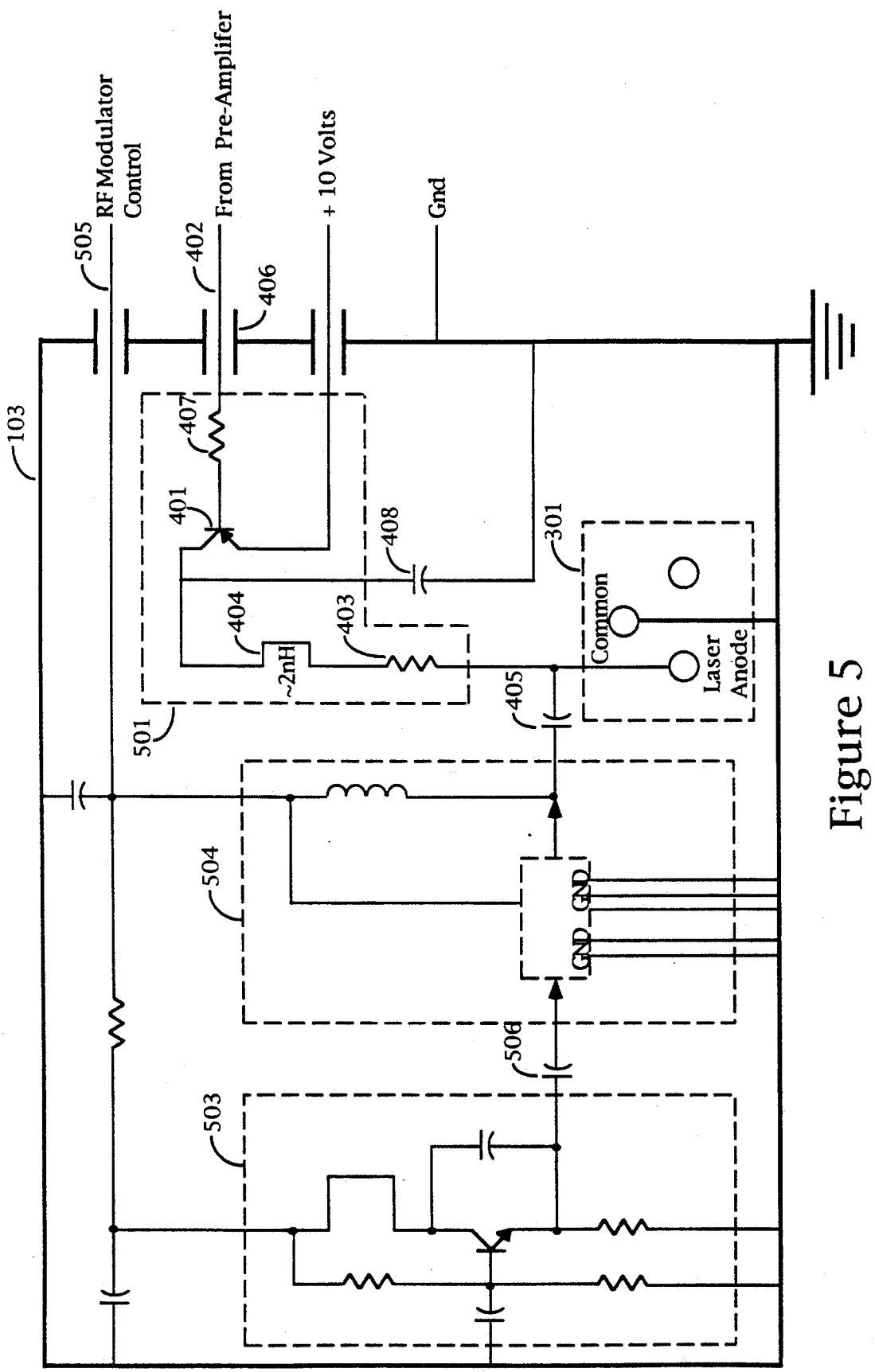
FIG. 5 is a circuit diagram illustrating the output stage of the laser driver and the RF modulator comprising an oscillator and an amplifier/modulator.

FIG. 5 is a circuit diagram illustrating the components and their respective values comprising the laser driver output stage 501, the laser diode 301, and the RF modulator. The RF modulator is comprised of a 1.0 GHz oscillator 503 and a MMIC amplifier/modulator 504. Oscillator 503 operates off an 8 mA D.C. current supplied from the RF modulator control line 505. The output of oscillator 503 is A.C. coupled through a 3.3 pF capacitor 506 to the input of MMIC amplifier/modulator 504 which outputs a 1 GHz modulated RF to laser diode 301.

In the currently preferred embodiment of the present invention, the RF modulator and laser driver output stage are implemented as a hybrid circuit. Transistor 401 in the laser driver output stage 2N5583 die. Transistor 507 implemented in oscillator 503 is a 2N2857 die. The amplifier/modulator 504 is comprised of an IC part number UPC1678P. The hybrid circuit is mounted inside the EMI shielding box. Three lines are coupled to the hybrid circuit: a +5 volt line for toggling power on/off to the RF modulator, a control line driving the base of transistor 401 for controlling the power level of laser diode 301, and a +10 volt line supplying power to the emitter of transistor 401.

Thus, an optical recording system having a low-emission high-bandwidth laser driver is disclosed.

What is claimed is:

1. An optical recording system having a light means for generating a light beam to write data to and read data from a storage medium, a modulating means for suppressing instabilities of said light means, and an apparatus for driving said light means, said apparatus comprising:

a transistor coupled to said light means for supplying current to said light means;

a shielding means enclosing said modulating means and said transistor for containing radio frequency energy emitted from said modulating means;

an amplifier coupled to said transistor for driving a base of said transistor to control a power level of said light means.

2. The apparatus of claim 1, wherein said light means is comprised of a laser diode enclosed within said shielding means.

3. The apparatus of claim 2, wherein said transistor is comprised of a collector coupled to an anode of said laser diode for supplying current to said anode and an emitter coupled to a regulated voltage supply.

4. The apparatus of claim 3 further comprising a resistor, an inductor, and a feed-through capacitor within said shielding means for reducing radio-frequency energy from being transmitted to said amplifier.

5. The apparatus of claim 4 further comprising a control loop for controlling a power level of said light beam generated by said laser diode, comprising:
   a means for measuring a power level of said light beam;
   a means for comparing said measured power level with a desired power level;
   a means for adjusting said power level based on said comparison.

6. The apparatus of claim 5 further comprising a microprocessor for controlling said power level of said light means.

7. The apparatus of claim 6, wherein said control loop has a bandwidth of over 50 MHz.

8. The apparatus of claim 7, wherein said modulating means has a radio frequency of approximately 1 GHz.

9. A method of driving a laser in an optical data storage system having a laser for writing data to a storage means and for reading data stored on said storage means, a modulating means for modulating said laser to minimize instabilities of said laser, and a microprocessor for controlling a power level of said laser, comprising the steps of:
   driving a base of a transistor at a level according to said microprocessor;
   driving said laser by an output of said transistor, wherein said power level of said laser is determined by how hard said base of said transistor is driven;
   enclosing said modulating means and said transistor within a single shielding means, wherein said single shielding means simultaneously shields both said modulating means and said transistor.

10. The method of claim 9 further comprising the step of shielding said laser.

11. The method of claim 10 further comprising the step of reducing energy emitted from said modulating means from being transmitted through a line coupled to said base of said transistor.

12. The method of claim 11 further comprising the steps of:
   measuring a power output from said laser;
   adjusting a level at which said base of said transistor is driven based on said measured laser power.

13. The method of claim 12, wherein said measuring and said adjusting steps are performed at a frequency of over 50 MHz.

14. The method of claim 13, wherein said modulating means have a radio frequency of approximately 1 GHz.

* * * * *